United States Patent Office 3,063,730
Patented Nov. 13, 1962

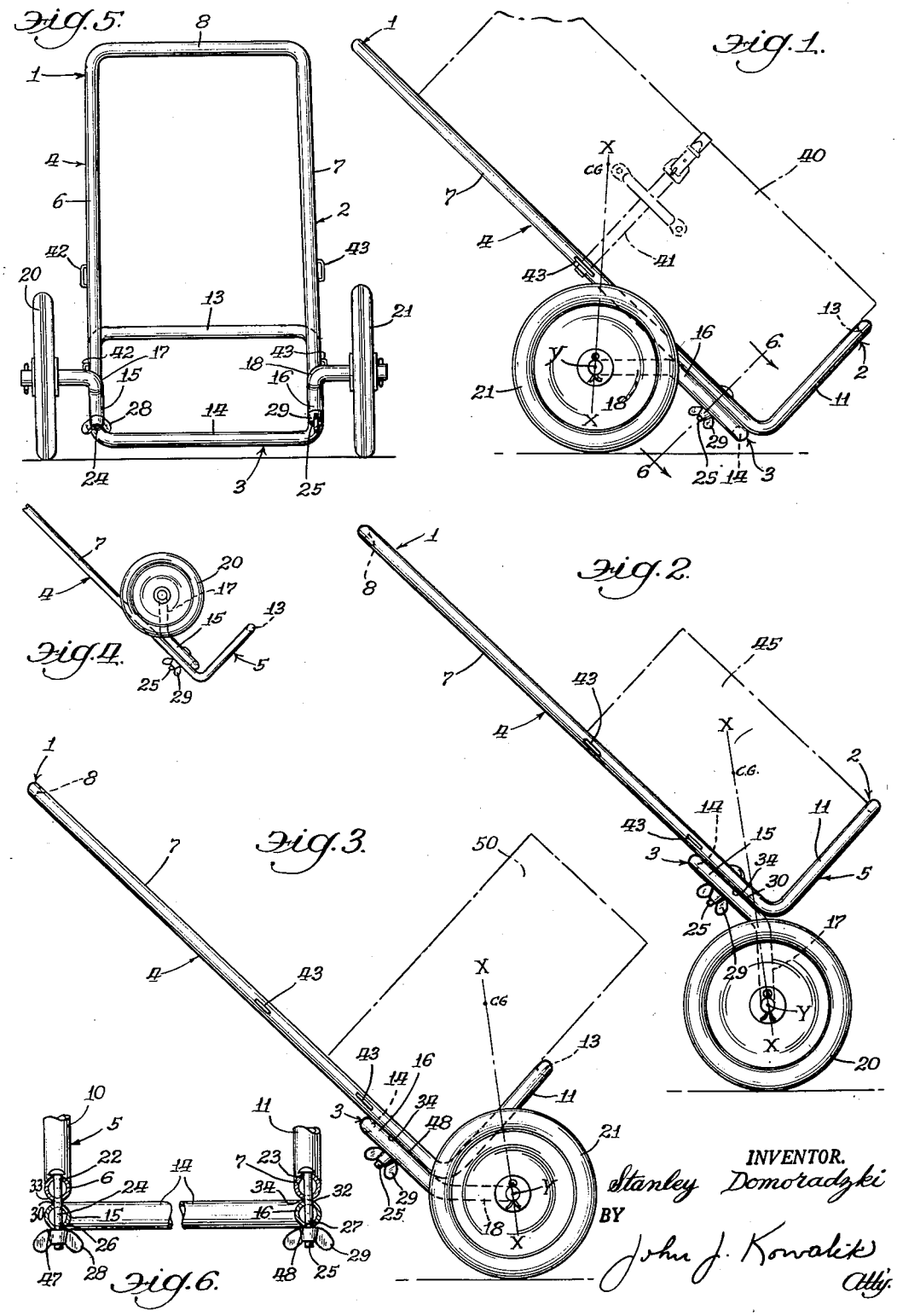

3,063,730
TRUCK WITH ADJUSTABLE WHEEL MOUNTING FOR PLURAL CENTER OF GRAVITY LOADING
Stanley Domoradzki, 617 N. Homan Ave., Chicago, Ill.
Filed Dec. 30, 1959, Ser. No. 862,957
2 Claims. (Cl. 280—47.21)

This invention relates to trucks of the type adapted for hand wheeling.

In trucks of the type under consideration the truck frame and wheel assembly are usually integrated or so assembled that for practical purposes the wheels and frame are a fixed assembly. The loads on the other hand are not generally of fixed dimension and therefore when loaded upon the truck strain the frame as well as the operator who attempts to balance the load across the axis of the supporting wheels. This frequently is not feasible because of ground clearances involved or because of the nature, namely the bulk and the weight of the load involved.

A general object of the invention is to provide a novel truck wherein the wheel and axle assembly are easily removed and attached to the truck frame to position the wheels at different locations with reference to the frame without changing the points at which the assembly is fastened to the frame.

A more specific object of the invention is to provide a wheel and axle assembly of novel design which may be assembled with the frame in a plurality of different ways to locate the wheels at different places with respect to the frame in accordance with the load to be carried so that the center of gravity of the load will lie substantially in a vertical plane passing through the axis of the wheel and axle assembly at the normal inclination or position of the truck frame.

The invention contemplates the provision of a truck frame providing a load bed and a wheel and axle assembly having a pair of coaxial wheels mounted upon arms which are arranged at an angle to and extend outwardly from second arms which connect to a cross-brace, the second arms each having a removable connection to the load bed of the frame.

A still further object of the invention is to provide such a novel wheel and axle and truck frame assembly wherein the parts may be easily arranged and secured together for ease in shipping in convenient parcels or cartons while fully assembled.

These and other objects inherent in and encompassed by the invention will become more readily apparent from the specifications and the drawings, wherein:

FIGURES 1, 2, 3 and 4 are side elevational views of my novel truck showing various portions of assembly of the parts;

FIGURE 5 is a rear elevational view of the truck in the position of FIGURE 1; and FIGURE 6 is a cross section taken generally on line 6—6 of FIGURE 1.

Describing the invention in detail and having particular reference to the drawings there is shown a truck generally designated 1 including a frame 2 and a wheel and axle assembly 3.

The frame includes a load bed portion 4 and a foot portion 5, the bed portion comprising a pair of laterally spaced elongated side members or beams 6 and 7 which are herein shown tubular and which at their upper ends merge into the opposite ends of a transverse generally horizontal handle portion 8 herein also shown merely for purposes of illustration as being tubular.

The lower extremity of the load bed portion 4 merges into the foot part 5 which comprises a pair of side members 10 and 11 respectively merging with and preferably projecting normal to the side members 6 and 7 upwardly and forwardly therefrom in normal operating position, the distal or upper ends of the members 10 and 11 joining and being integral with opposite ends of a cross-member 13.

The wheel and axle assembly comprises a cross-bar 14 which is of a length spanning the distance between the side members 6 and 7 of the load bed portion and at opposite ends is bent to provide a pair of arms 15 and 16 extending preferably normal to cross-bar 14. The arms 15 and 16 are provided with extensions 17 and 18 respectively which are disposed at an obtuse angle with respect thereto. The arm extensions 17 and 18 are respectively provided with generally horizontal outwardly extending stub shafts which journal the load sustaining wheels 20 and 21 respectively.

The side elements 6 and 7 of the load bed portion of the frame are apertured at 22 and 23 respectively and receive the bolts 24 and 25 which pass through apertures 26 and 27 in the arms 15 and 16 in the position of FIGURES 1 and 5. The lower ends of the bolts have wing nuts 28 and 29 threaded thereon which secure the wheel and axle assembly to the frame.

Referring now to FIGURES 1 and 5 the truck is shown assembled in support of load having a center of gravity disposed a considerable distance upwardly and rearwardly of the toe end of the truck. In this position the top sides 30 and 32 of the arms 15 and 16 engage with the bottom sides 33 and 34 of the side members 6 and 7 and the bolts 24 and 25 extending through 6 and 7 also extend through arms 15 and 16. The arm extensions 17 and 18 project rearwardly of arms 15 and 16 and are located in an area intermediate the top and bottom of the load bed portion 4. Thus the load which is herein represented as a large trunk 40 and extends to practically the top of the bed 4 is carried in normal position, that is with the bed inclined between 40° and 50° and the center of gravity of the load represented by CG is located in a vertical plane X—X which passes through the axis y of the wheel and axle assembly. This load is thus easily balanced and maneuverable by the operator. A strap 41 may be passed through loops 42, 43 on side members 6 and 7 and secured about the load 40.

In FIGURE 2 a different load condition is represented where the center of gravity is closer to the lower end of the bed portion 4 as represented by CG on the package 45. In this situation the wheel and axle assembly is turned 180° from the position of FIGURE 1 and the arm 16 is beneath member 6 and arm 15 beneath member 7 and top sides 30, 32 engage bottom sides 34, 33 and the respective bolts 24 and 25 passed through members 6, 16 and 15, 7. The cross-bar 14 is behind the arms which project downwardly and forwardly and the arm extensions 17 and 18 extend substantially vertically. It will be seen that the CG of item 45 is coincident to the plane X—X which passes through the axis y.

In FIGURE 3 the wheel and axle assembly has been rotated about the longitudinal axis of the frame from the position of FIGURE 2 and the bottom sides 47 and 48 of arms 15 and 16 respectively engage the bottom sides 33 and 34 of members 6 and 7 and the arm extensions 17 and 18 project under the foot portion disposing the axis y of the wheels beneath the foot portion 5 in the vertical plane X—X which passes through the CG of the load item 50.

The wheel and axle assembly may be superposed with respect to the bed frame as shown in FIGURE 4 for crating or packaging for shipment in which case the arms 15 and 16 seat on the members 7 and 6 respectively and are clamped thereto by the respective bolts. The wheels are thus tucked behind the foot structure.

Thus it will be readily apparent that a novel truck is herein disclosed which by simple adjustment of the novel wheel arrangement provides optimum efficiency so that the truck may be simply made and easily operated.

It will be understood that various forms of the invention will become readily apparent from the foregoing disclosure which is not intended as a limitation and that the scope of the invention is to be gauged by the claims appended hereto.

I claim:

1. In a truck, a frame having a load bed, said bed having a pair of longitudinal side elements, a wheel and axle assembly having a rigid U-shaped frame comprising a bed-forming cross-member extending transversely of said elements and having a pair of arms in alignment with respective side elements, said arms and cross-member lying in a common plane, integral arm extensions projecting from respective arms at an angle to said plane, wheel mounting means on the distal ends of said extensions, wheels on said mounting means coaxially disposed; said U-shaped frame positionable above said bed and below the bed and having obverse and reverse sides with either side engageable against the bed and with the arms projecting toward either end of the bed, said extensions in one position of the U-shaped frame projecting beyond one end of the bed and above the plane of the bed, and means releasably securing said frame to the bed in any of said positions of the frame.

2. The invention according to claim 1 and said bed having top and bottom mounting areas, and said U-shaped frame having top and bottom mounting areas, and said U-shaped frame and bed having common points of connection in all relative positions thereof at said mounting areas.

References Cited in the file of this patent

UNITED STATES PATENTS

| | | |
|---|---|---|
| 147,845 | Jones | Feb. 24, 1874 |
| 267,669 | Brown | Nov. 21, 1882 |
| 1,560,802 | Julstedt | Nov. 10, 1925 |
| 2,728,584 | Brown | Dec. 27, 1955 |

FOREIGN PATENTS

| | | |
|---|---|---|
| 148,454 | Australia | Apr. 5, 1951 |
| 734,075 | France | July 25, 1932 |
| 886,929 | France | July 19, 1943 |
| 209,196 | Great Britain | Jan. 7, 1924 |
| 179,619 | Switzerland | Dec. 2, 1935 |